United States Patent
Boser et al.

(10) Patent No.: US 9,846,055 B2
(45) Date of Patent: Dec. 19, 2017

(54) CONTINUOUS MODE REVERSAL FOR REJECTING DRIFT IN GYROSCOPES

(71) Applicant: THE REGENTS OF THE UNIVERSITY OF CALIFORNIA, Oakland, CA (US)

(72) Inventors: Bernhard E. Boser, Berkeley, CA (US); Mitchell H. Kline, Oakland, CA (US); Igor Izyumin, Oakland, CA (US); Yu-Ching Yeh, Berkeley, CA (US); Burak Eminoglu, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 127 days.

(21) Appl. No.: 14/884,606

(22) Filed: Oct. 15, 2015

(65) Prior Publication Data
US 2016/0109258 A1    Apr. 21, 2016

Related U.S. Application Data

(63) Continuation of application No. PCT/US2014/034410, filed on Apr. 16, 2014.
(Continued)

(51) Int. Cl.
*G01C 19/00* (2013.01)
*G01C 25/00* (2006.01)
(Continued)

(52) U.S. Cl.
CPC .......... *G01C 25/00* (2013.01); *G01C 19/5705* (2013.01); *G01C 19/5726* (2013.01); *G01C 19/5776* (2013.01)

(58) Field of Classification Search
CPC ................ G01C 19/56; G01C 19/5705; G01C 19/5712; G01C 19/5719; G01C 19/5726; G01C 19/5776
(Continued)

(56) References Cited

U.S. PATENT DOCUMENTS

| 5,315,874 A | * | 5/1994 | Petrovich | ............ | G01P 15/0802 |
| | | | | | 310/348 |
| 7,565,839 B2 | | 7/2009 | Stewart et al. | | |

(Continued)

FOREIGN PATENT DOCUMENTS

| EP | 1 752 735 B1 | 3/2004 |
| WO | 2006-012104 A1 | 2/2006 |

OTHER PUBLICATIONS

Korea Intellectual Property Office (KIPO), International Search Report and Written Opinion, PCT/US2014/034410, dated Aug. 25, 2014, pp. 1-18, with claims examined, pp. 19-26.
(Continued)

*Primary Examiner* — Benjamin Schmitt
(74) *Attorney, Agent, or Firm* — O'Banion & Ritchey LLP; John P. O'Banion

(57) ABSTRACT

A vibratory gyroscope system is described which utilizes a mechanical resonator having a first mode of vibration and an associated first natural frequency, and a second mode of vibration having an associated second natural frequency. The angular rate of motion input couples energy between the first and second modes of vibration. The gyroscope has driver circuits, sensors and actuators for the first and second modes. The invention utilizes a bias error shifting method which provides for shifting the bias error away from DC to a higher frequency, where it can be removed by low pass filtering. As a result of the inventive method, gyroscope systems can be produced with significantly lower bias error.

29 Claims, 6 Drawing Sheets

Related U.S. Application Data

(60) Provisional application No. 61/812,420, filed on Apr. 16, 2013.

(51) Int. Cl.
  *G01C 19/5726* (2012.01)
  *G01C 19/5705* (2012.01)
  *G01C 19/5776* (2012.01)

(58) Field of Classification Search
  USPC .............. 73/504.02, 504.12, 514.29
  See application file for complete search history.

(56) References Cited

U.S. PATENT DOCUMENTS

| | | | |
|---|---|---|---|
| 7,886,598 B2 | 2/2011 | Wyse et al. | |
| 2003/0200807 A1 | 10/2003 | Hulsing, II | |
| 2005/0022596 A1* | 2/2005 | Lehureau | G01C 19/5642 73/504.12 |
| 2006/0260382 A1 | 11/2006 | Fell et al. | |
| 2007/0028686 A1 | 2/2007 | Wyse et al. | |
| 2011/0167891 A1 | 7/2011 | Geen | |
| 2011/0265566 A1 | 11/2011 | Acar et al. | |
| 2013/0031950 A1* | 2/2013 | Donadel | G01C 19/5776 73/1.77 |

OTHER PUBLICATIONS

The Institiute of Electrical and Electronic Engineers, Inc., "Standard Specification Format Guide and Test Procedure for Single-Axis Laser Gyros", IEEE Std. 647-1995, 1996, 84 pages.

Lynch, "Vibratory Gyro Analysis by the Method of Averaging", The 2nd Saint Petersburg International Conference on Gyroscopic Technology and Navigation, Part I, 1995, pp. 26-34.

Seeger et al., "Development of High-Performance, High-Volume Consumer MEMS Gyroscopes", Technical Digest Solid-State Sensor, Actuator and Microsystems Workshop, Hilton Head Island, 2010, 5 pages.

* cited by examiner

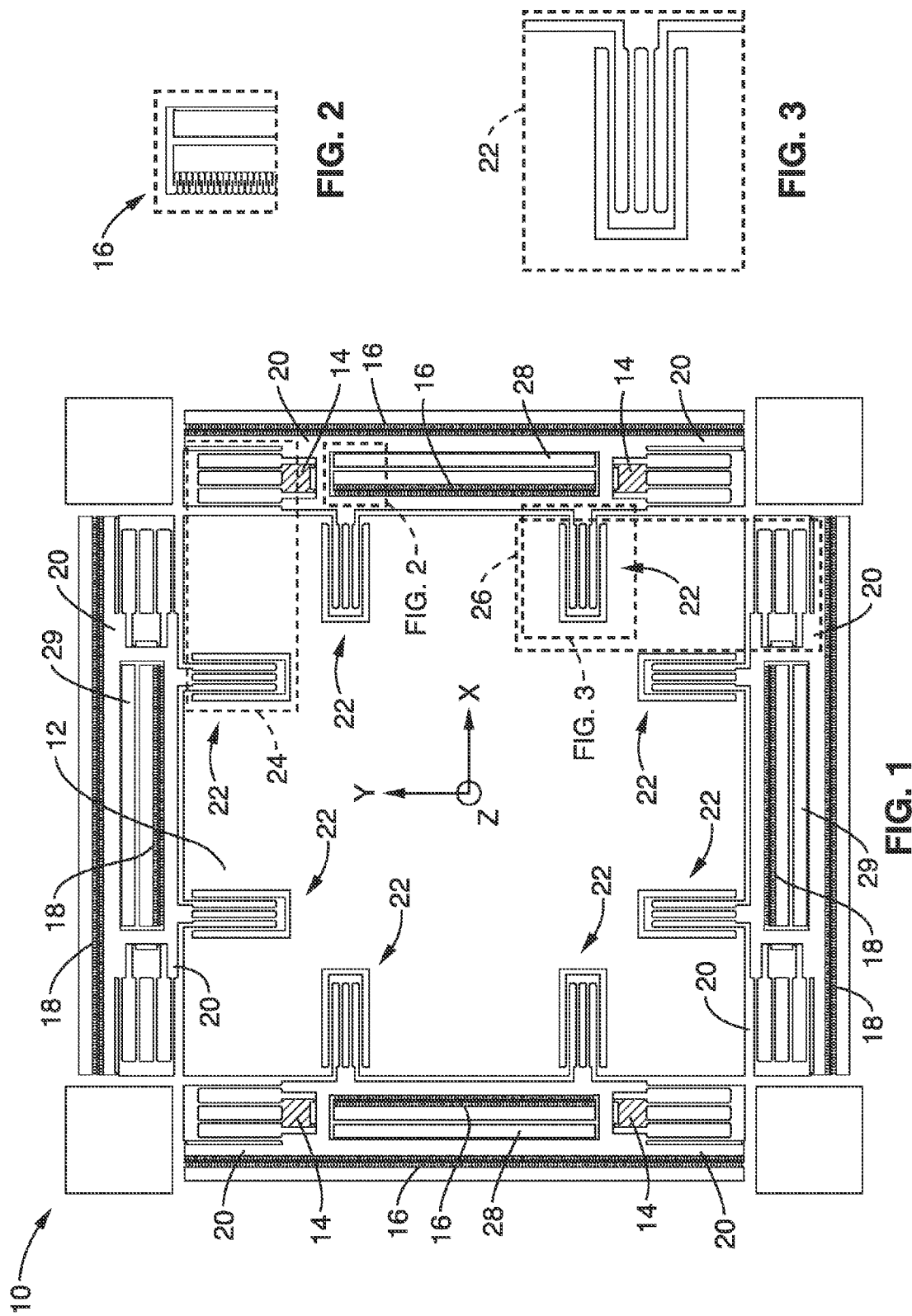

CONTINUOUS MODE REVERSAL FOR REJECTING DRIFT IN GYROSCOPES

CROSS-REFERENCE TO RELATED APPLICATIONS

This application is a 35 U.S.C. §111(a) continuation of PCT international application number PCT/US2014/034410 filed on Apr. 16, 2014, incorporated herein by reference in its entirety, which claims priority to, and the benefit of, U.S. provisional patent application Ser. No. 61/812,420 filed on Apr. 16, 2013, incorporated herein by reference in its entirety. Priority is claimed to each of the foregoing applications.

The above-referenced PCT international application was published as PCT International Publication No. WO 2014/172487 on Oct. 23, 2014, which publication is incorporated herein by reference in its entirety.

STATEMENT REGARDING FEDERALLY SPONSORED RESEARCH OR DEVELOPMENT

This invention was made with Government support under W31P4Q-11-1-0003 and W31P4Q-12-1-0001, awarded by the Defense Advanced Research Projects Agency (DARPA). The Government has certain rights in this invention.

INCORPORATION-BY-REFERENCE OF COMPUTER PROGRAM MATERIAL

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to vibratory gyroscopes, and more particularly to bias error cancellation in vibratory gyroscopes.

2. Description of Related Art

A gyroscope is a device for measuring or maintaining orientation, based on angular momentum principles. Gyroscopes can be of a mechanical, electronic, or electromechanical construction (e.g., micro-electro-mechanical systems (MEMS)).

Numerous applications for gyroscopes exist, such as inertial navigation, stabilization, or maintaining direction. Many gyroscope applications, including navigation, require a low offset. Measures of gyroscope offset include zero rate output (ZRO) and bias error. Although calibration can be utilized to cancel gyroscope offset, generally this error arises in response to environmental conditions, such as temperature and pressure which change over time, whereby periodic recalibration would be required. Recalibration in the field is not only an imposition to the user, but is further complicated by the challenge of subjecting the sensor to a known angular rate. For example, precision gyroscopes are affected by ambient pressure and temperature variations that corrupt the measured rate signal.

Accordingly, a need exists for a gyroscope with reduced offset and sensitivity to ambient variations. The present invention fulfills that need and overcomes a number of shortcomings that exist in previous gyroscopic solutions.

BRIEF SUMMARY OF THE INVENTION

A method is disclosed for reducing the bias error or zero rate output, of angular rate gyroscopes through continuous time modulation. Using this new paradigm, the bias error is shifted away from DC to a higher frequency (e.g., 100 Hz) where it does not interfere with the signal and can be removed through filtering. Utilizing this bias error shifting enables fabrication of gyroscopes with significantly lower bias error than are achievable with current state-of-the art gyroscopes, and are particularly well-suited for applications such as navigation, because the current inexpensive consumer MEMS gyroscopes are not adequate.

The present invention appreciates the pressing need for techniques for continuously calibrating gyroscopes without interrupting the ordinary rate measurement process and without the need for a known, or reference angular rate input. The present invention describes a family of techniques for accomplishing this object. These techniques are based on excitation and sensing of both resonator axes, as opposed to the conventional approach of designating one axis as "drive" and the other axis as "sense."

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a layout of a 2-axis gyroscopic resonator utilized according to an embodiment of the present invention.

FIG. 2 is a layout of a comb drive and parallel plate tuning structure within the transducer of FIG. 1 utilized according to an embodiment of the present invention.

FIG. 3 is a layout of a folded spring structure within the transducer of FIG. 1 utilized according to an embodiment of the present invention.

DETAILED DESCRIPTION OF THE INVENTION

Figure 4:
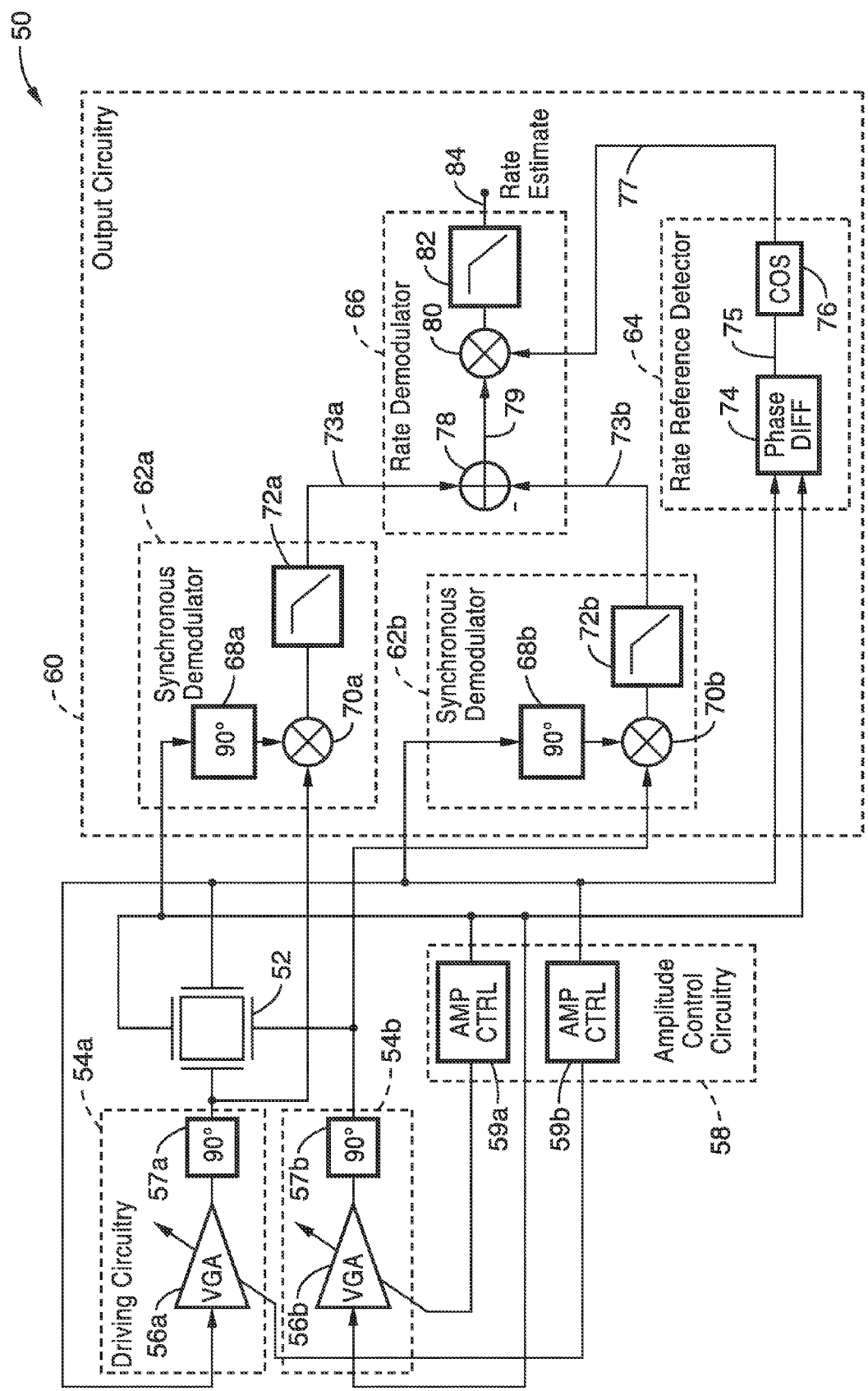
FIG. 4 is a schematic block diagram for a vibratory gyroscope system that derives a nominally bias-free rate estimate by measuring sustaining forces applied to both axes of a resonator according to an embodiment of the present invention.

1. Resonator with Sensing and Actuating Means

In a mechanical resonator of a vibratory gyroscope, as exemplified herein, a proof mass is suspended by springs and is free to move along two orthogonal axes or a ring, hemisphere, or similar continuous structure which is free to vibrate in at least two orthogonal or independent modes or axes. Vibration of the mass can occur on both axes simultaneously, with frequencies determined by the natural frequencies of each axis, while the velocity amplitudes of each vibration are preferably constant and equal. This natural frequency of an axis is set by the mechanical stiffness of the axis and mass that participates on the axis as well as the influence of artificial stiffness that can be contributed by tuning inputs. Angular rate is then inferred through a measurement of one or both of the axis oscillation frequencies.

FIG. 1 is an example embodiment 10 of a mechanical resonator with at least two modes of vibration, along the x- and y-directions, coupled by the Coriolis Effect. A mode of vibration is defined as any number of independent mechanical deformations of the resonator, where the total deformation can be described as the sum of the deformations of the individual modes. A deformation should be understood as a continuous vector field which describes the mechanical displacement of each point of the resonator as a function of its position in three-dimensional space. Deformations are, in general, considered to be time varying. A resonator actuated upon by a forced deformation in a particular vibration mode will store a corresponding amount of strain energy. When released, the resonator will attempt to dissipate this strain energy. For a lossless linear resonator, the result of this action is a sinusoidal vibration of the resonator in that particular vibration mode. The inverse of the time it takes to complete one cycle of vibration is called the natural frequency of the vibration mode. The amplitude, or envelope, of the displacement vibration is defined as half the peak-to-peak displacement at an antinode of the deformation. An antinode is a position of maximum deformation of the particular vibration mode. The amplitude of the velocity of the vibration is equal to the oscillation frequency multiplied by the amplitude of the displacement vibration.

In order for the resonator to be sensitive to rate, the modes must be coupled by the Coriolis Effect. The Coriolis Effect is an effect observed in the rotating frame, whereby energy from one mode of the resonator is coupled into another mode of the resonator, such as from the x-axis to the y-axis, or between orthogonal modes, including from a first mode of vibration to a second mode of vibration. Modes that are coupled by the Coriolis Effect will occasionally be referred to as axes and given names which correspond to their direction of vibration in the rotating frame, such as the x-axis. The rotating frame is a frame of reference perceived by an observer of the resonator which is also rotating at the same rate as the resonator. Common mechanical resonators include pendulums, lumped mass-spring systems, rings, disks, and hemispheres.

Methods of operation will occasionally be described by the trajectory that a proof mass follows when using the particular mode of operation. These descriptions can only be literally interpreted for pendulum or lumped mass-spring systems, but an extension to rings, disks, and hemispheres can be understood in terms of combinations of independent vibrations of the modes. For example, a pendulum swinging at a 45 degree angle corresponds to equal amplitude, in-phase vibrations on both orthogonal modes. A circular pattern corresponds to equal amplitude oscillations of both orthogonal modes with a constant 90 degree phase difference.

In the figure, the lumped mass-spring resonator 10 has two primary modes of vibration. A central proof mass 12 is anchored at regions 14 (e.g., to the underlying substrate). The central proof mass 12 is thus configured for vibration along the x- and y-directions. The resonator is configured with a means for transduction of mechanical deformations into electrical signals (sensing) and transduction of electrical signals to mechanical deformations (actuating) for each mode of vibration. This is typically accomplished electrostatically through addition of electrodes forming either parallel plate 28, 29 or comb-type 16, 18 capacitors to the resonator. Other means of transduction include piezoelectric, magnetic, or optical coupling.

The motion of the proof mass can be actuated, as well as sensed, such as by utilizing x-axis comb drives 16, and y-axis comb drives 18. The comb drives are designed to be responsive to only one direction of proof mass motion by residing in their own frames 20 which are isolated from the orthogonal direction by decoupling springs 22. Springs are shown for the x axis 24 and y axis 26. A set of x axis 28 and y axis 29 parallel plate tuning electrodes allow for electrostatic modification of the gyroscope mechanical frequencies.

In at least one preferred embodiment, the resonator is symmetric with respect to the Coriolis coupled vibration modes. Accordingly, each Coriolis coupled vibration mode is preferably configured with identical sensing and actuating means, and the natural frequencies of the vibration modes are closely matching. It is preferable that the natural frequencies match within 10% of the nominal value of the natural frequency, while matching within 1% or less is more preferable. For example, the mechanical resonator would preferably have an x-axis natural frequency and a y-axis natural frequency which match to within 10% (or more preferably 1%), with the sensing and actuating means for each axis being identical.

FIG. 2 depicts a magnified view of a portion of the comb drives 16 of FIG. 1.

FIG. 3 depicts a magnified view of a portion of the decoupling springs 22 of FIG. 1.

In regard to the resonator of FIG. 1, proof mass 12 is considered as a mass m, which together with x-axis spring combination 24, and y-axis spring combination 26 having stiffness $k_x$ and $k_y$, define mechanical frequencies for each axis as $\omega_{mx} = \sqrt{k_x/m}$ and $\omega_{my} = \sqrt{k_y/m}$.

A set of x axis 28 and y axis 29 parallel plate tuning electrodes are configured for allowing electrostatic modification of the gyroscope mechanical frequencies. The natural frequencies, denoted by $\omega_{ox}$ and $\omega_{oy}$, of the gyroscope in a preferred embodiment are then influenced by the mechanical mass and spring, as well as the electrical tuning signal. The natural frequencies are defined as the resonant frequencies of each mode of vibration in the absence of angular rate and damping. If the natural frequencies of the modes of vibration are equal, the resonator is said to be mode-matched.

It should be appreciated that each transducer axis also experiences undesired mechanical damping due to the combined effects of air resistance, anchor loss, and thermoelastic properties of the material. In a two degree of freedom resonator, the damping on the x- and y-axes is modeled by $c_x$ and $c_y$. The damper in combination with the mass determine the mechanical ring down time constant of each axis as $\tau_x=2m/c_x$ and $\tau_y=2m/c_y$, respectively. This ring down time can be equivalently modeled as the resonator bandwidth in the frequency domain with $\beta_x=1/\tau_x$ and $\beta_y=1/\tau_y$.

Further mechanical elements that are considered include parasitic springs and dampers that couple motion in one direction to motion in an orthogonal direction. For example, in the two degree of freedom transducer, there is undesired coupling from x- to y-axis motion. A portion of this motion is attributed to a spring $k_{xy}$ and part by a damper $c_{xy}$. The spring causes a force $k_{xy}x$ and the damper a force $c_{xy}\dot{x}$ (where $\dot{x}$ denotes the derivative of x with respect to time) to act on the proof mass in the y-direction when displaced in the x-direction. The same statement applies with the roles of x and y reversed. The spring is equivalently represented by a frequency $\omega_{xy}=\sqrt{k_{xy}/m}$ and the damper by a bandwidth $\beta_{xy}=c_{xy}(2m)^{-1}$.

2. Dual Force Readout Gyroscope in Self-Oscillation

FIG. 4 illustrates an example embodiment 50 of a vibratory gyroscope system that derives a nominally bias-free rate estimate by measuring sustaining forces applied to both axes of a resonator 52. Constant amplitude oscillations are sustained on each axis by two driving circuits 54a, 54b, and amplitude control circuitry 58. Output circuitry 60 connects to sensing and actuating means of the resonator and produces the angular rate estimate 84.

Driving circuitry 54a, 54b, in combination with each axis (x and y) of resonator 52 form an oscillator. The oscillation frequency is set by the natural frequency of an axis. There are two such oscillators: one for the x-axis and one for the y-axis. The natural frequencies are not equal, so there is a finite frequency difference between the axes, which will be referred to as the split frequency. Each of the driving circuits 54a, 54b are exemplified as comprising a variable gain amplifier (VGA) 56a, 56b, and a 90 degree phase shifter 57a, 57b. The gain of the VGAs 56a, 56b is controlled by amplifier control circuits 59a, 59b of amplitude control circuit 58. The phase shift is necessary to compensate for the 90 degree phase relationship between applied mechanical force and sensed mechanical displacement at resonance.

Output circuitry 60 comprises synchronous demodulators 62a, 62b, a rate reference detector 64, and a rate demodulator 66. Each of the synchronous demodulators 62a, 62a, produces the component of applied sustaining force 73a, 73b that is in-quadrature with the corresponding axis displacement. One embodiment of the synchronous demodulator comprises a 90 degree phase shifter 68a, 68b, a multiplier 70a, 70b, and a low pass filter 72a, 72b, for generating the quadrature components 73a, 73b, of the sustaining force. The displacement or velocity signal from an axis of resonator 52 is first shifted by 90 degrees 68a (or 68b), to multiply 70a (or 70b) the drive signal of that resonator axis. The resulting signal is then low-pass filtered 72a (or 72b) to remove unwanted high frequency components. Two synchronous demodulators demodulate applied forces to generate output for the x-axis 73a, and the y-axis 73b.

The rate reference detector 64 generates (produces) a phase difference signal, which is a cosine in this example embodiment, of the phase difference between the displacement signals from the two axes. Rate reference detector 64 is exemplified comprising a phase differencing element 74, which determines the phase difference between the two input sinusoids, with phase difference signal 75 output to a detector 76, depicted for determining and outputting the cosine 77 of this phase difference.

One possible embodiment of the rate reference detector 64 is a multiplier (74), which multiplies the displacement or velocity signals from the first and second resonator axes together, followed by a low pass filter. The output of the low pass filter is approximately equal to the cosine (76) of the phase difference between the displacement or velocity signals from the first and second resonator axes.

In at least one embodiment, the rate demodulator, first determines a difference at minus sum junction 78, whose output 79, along with cosine 77 (as the demodulated forces) are multiplied 80, with the output received by a low pass filter 82 to remove undesired high frequency tones in the output rate estimate signal 84.

Figure 5:
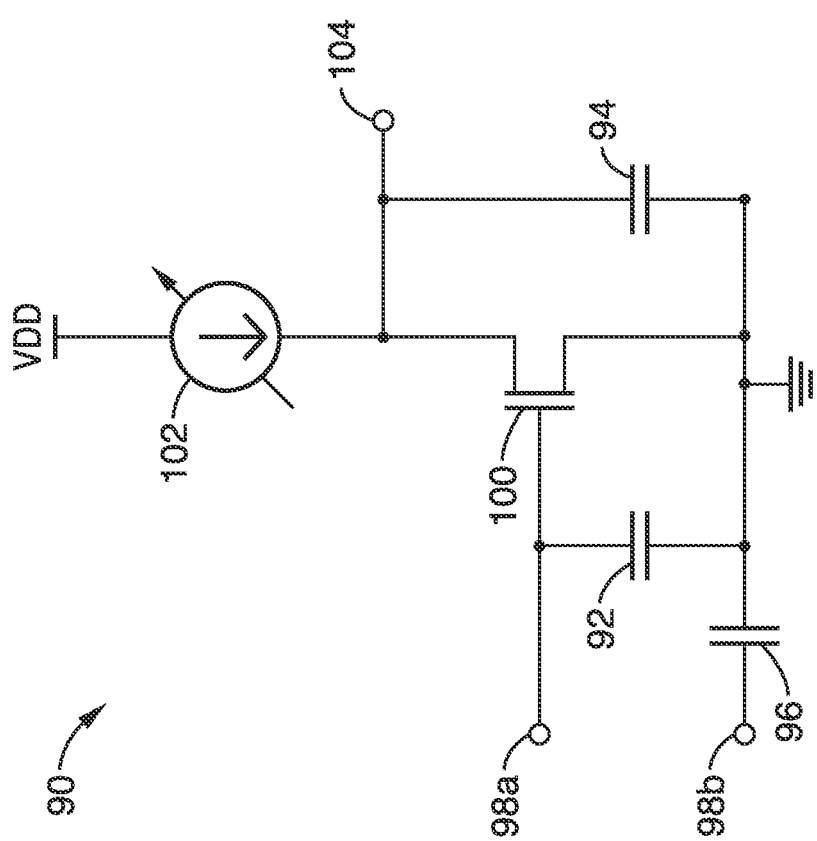
FIG. 5 is a schematic of a variable gain amplifier (VGA) and phase shifter implemented by way of example as a Pierce oscillator, according to an embodiment of the present invention.

FIG. 5 illustrates an example embodiment 90 of VGA 56a, 56b and phase shifter 58a, 58b, shown implemented with a Pierce oscillator. Pierce oscillator 90 comprises three capacitors 92, 94, 96, an NMOS transistor 100, and an adjustable current source 102. Inputs 98a, 98b are configured with the terminal of 98a connecting to resonator sensing means, while the terminal of input 98b connects to resonator bias terminal or analog ground. Output is through terminal 104, configured for connecting to a resonator driving means. Transistor 100 along with capacitor 94 create the 90 degrees of phase shift. Current source 102 allows for adjustment of the transconductance of the transistor which also adjusts the gain of the amplifier. The voltage across capacitor 92 is representative of the displacement of the resonator.

The amplitude control circuitry adjusts the gain of the VGA in the driving circuitry in order to maintain a constant envelope of the resonator displacement or velocity. One of ordinary skill in the art will appreciate that numerous alternative implementations of this amplitude control circuitry can be utilized without departing from the teachings of the present invention.

The combined effect of drive circuitry and amplitude control circuitry result in constant displacement or velocity amplitude vibrations at the resonant frequencies on each resonator axis. If the displacement or velocity amplitude vibrations are constant, the resulting proof mass trajectory is a Lissajous pattern.

Figure 6:
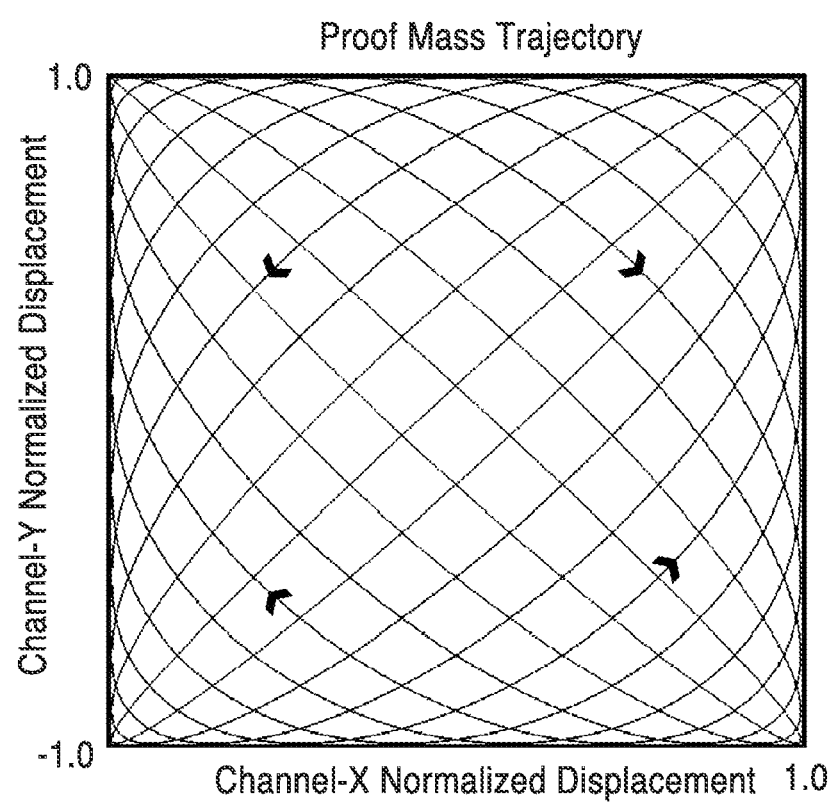
FIG. 6 is a graph of proof mass Lissajous trajectory in the x-y plane of a gyroscope resonator operating in LFM mode according to an embodiment of the present invention.

FIG. 6 depicts an example Lissajous pattern showing x and y normalized displacements of the proof mass.

Returning to a discussion of the gyroscope circuit of FIG. 4, it can be shown that the forces as measured on each axis, including relevant error sources, are:

$$F_{xs}=-2mv_o(-\beta_x+(\alpha_z\Omega_z-\Omega_c)\cos\Delta\phi_{xy}+\Omega_{ky}\sin\Delta\phi_{xy})$$

$$F_{ys}=-2mv_o(-\beta_y+(-\alpha_z\Omega_z-\Omega_c)\cos\Delta\phi_{xy}-\Omega_{kx}\sin\Delta\phi_{xy}), \quad (1)$$

where $F_{xs}$ 73a and $F_{ys}$ 73b are the measured forces for the x-axis and y-axis, respectively, m is the resonator mass, $v_o$ is the velocity amplitude of the oscillations, $\beta_x$ and $\beta_y$ are the resonator bandwidths, $\alpha_z$ is the angular gain factor, $\Omega_z$ is the input angular rate, $\Omega_c$ is the bias error due to damper-coupling, $\Omega_{kx}$ and $\Omega_{ky}$ are the errors due to spring-coupling, and $\Delta\phi_{xy}$ 75 is the phase difference between the x- and y-axis oscillations. To simplify the analysis, the velocity amplitudes of the two modes are assumed to be equal.

The phase difference between the axes $\Delta\phi_{xy}$ is approximately a ramp function with respect to time. This is because the resonator axes are oscillating at two different frequencies. The phase difference $\Delta\phi_{xy}$ is approximately equal to $\Delta\omega t$, where $\Delta\omega$ is the split frequency. Thus, as can be seen from the above equations, the rate signal is amplitude modulated to the split frequency. A consequence of this type of amplitude modulation is that the bandwidth of the rate measurement will be limited to less than the split frequency.

It should be appreciated that in an ideal gyroscope, the measured forces are:

$$F_{xs,ideal} = -2mv_o \alpha_z \Omega_z \cos \Delta\phi_{xy}$$

$$F_{ys,ideal} = 2mv_o \alpha_z \Omega_z \cos \Delta\phi_{xy}. \quad (2)$$

The measured forces in the case of an ideal gyroscope are purely proportional to input rate; thus, the measurement is free from bias. It is therefore desirable to reject the terms due to $\beta_x$, $\beta_y$, $\Omega_c$, $\Omega_{kx}$, and $\Omega_{ky}$ in Eq. 1 for $F_{xs}$ and $F_{ys}$. This is accomplished as follows.

First, the error due to resonator bandwidth $\beta_x$, $\beta_y$ is rejected due to the continuous time modulation of the rate signal. The rate signal $\Omega_z$ is multiplied by $\cos(\Delta\omega t)$ whereas the resonator bandwidth error is not. The multiplication by $\cos(\Delta\omega t)$ effectively shifts the rate signal to a higher frequency so that it may be separated from the error term due to $\beta_x$ and $\beta_y$.

Second, the spring-coupling error is rejected as it appears in quadrature with the rate signal. The terms containing $\Omega_{kx}$ and $\Omega_{ky}$ are multiplied by $\sin(\Delta\omega t)$, whereas the terms containing $\Omega_z$ are multiplied by $\cos(\Delta\omega t)$. Because the sine and cosine functions are orthogonal, the rate signal can be distinguished from the error due to spring coupling.

Third, it should be appreciated that the cross-damping error due to $\Omega_c$ appears with the same sign in the equations for and $F_{xs}$ and $F_{ys}$, while the rate inputs appear with opposite signs. Thus, the cross-damping error is rejected through the operation $F_{xs}-F_{ys}$, giving:

$$F_{xs}-F_{ys} = -2mv_o(-\beta_x+\beta_y+2\alpha_z\Omega_z \cos\Delta\phi_{xy}+(\Omega_{kx}+\Omega_{ky})\sin\Delta\phi_{xy}). \quad (3)$$

Effectively, cancellation of the cross-damping error is enabled by using both gyroscope axes (x and y) in order to measure rate. Conventional approaches which designate a "drive" and a "sense" axis cannot cancel this error type, as the rate measurement is accomplished with only the sense axis. It should thus be appreciated that since the force signals are combined from both axes this enables the inventive gyroscope to cancel the cross-damping error. Conventional gyro methodology which designates a "drive" and "sense" axis cannot separate the rate from cross-damping, as they have essentially only one of the and $F_{xs}$ $F_{ys}$ equations, whereas the present invention has both due to continuous excitation of both modes. Multiplication of the above equation by $\cos \Delta\phi_{xy}$ followed by low-pass filtering yields a bias-free rate estimate:

$$(F_{xs}-F_{ys})\cos \Delta\phi_{xy} = -2mv_o\alpha_z\Omega_z. \quad (4)$$

It should be appreciated that the damper-coupling error is fully cancelled only when the velocity amplitudes of the two modes are equal.

Many variations on the embodiments described above and represented in the referenced figures can be implemented without departing from the teachings of the present invention. A few of these variations include the following. Synchronous demodulation of the displacement or velocity signals from the resonator, may be replaced by asynchronous demodulation as in an envelope or magnitude detector. The driving circuitry can be replaced by a phase locked loop (PLL), which locks to the displacement or velocity signal from a resonator axis and produces a clock with which to drive the resonator. If the resonator has tuning electrodes, these electrodes can be used to modify the split frequency to a desired value or a desired modulation pattern. If damper-coupling error is not significant, the output can be directly calculated from either 73a or 73b individually.

One limitation of the implementation of FIG. 4, is that the bandwidth is limited to the split frequency. The next section describes embodiments which overcome this bandwidth limitation.

3. Dual Force Readout in Forced Oscillation

Figure 7:
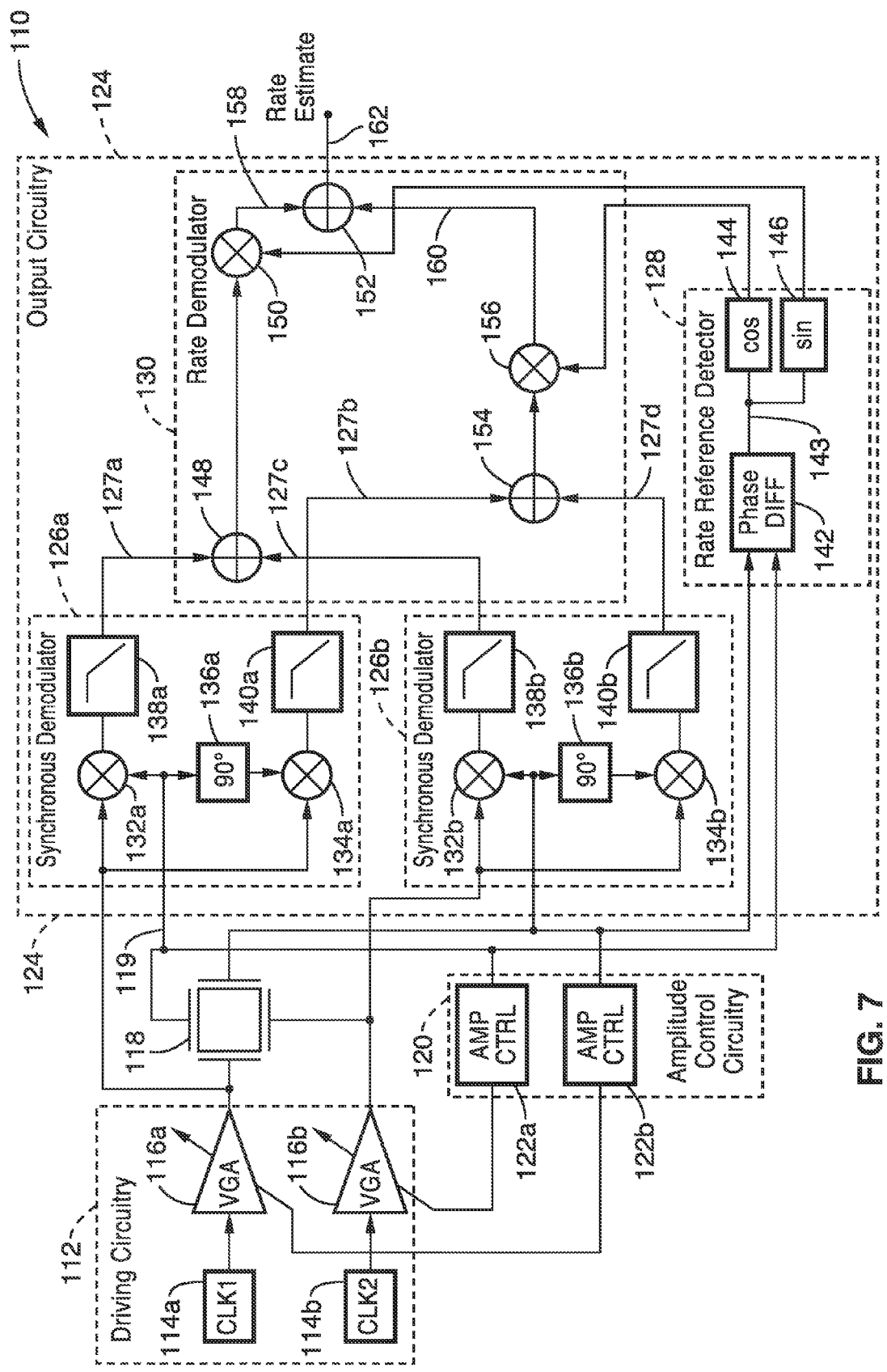
FIG. 7 is a schematic block diagram of a vibratory gyroscope system that derives a high-bandwidth, nominally bias-free rate estimate, according to an embodiment of the present invention.

FIG. 7 shows a vibratory gyroscope system 110 that derives a high-bandwidth, nominally bias-free rate estimate. The driving circuitry 112 in combination with the amplitude control circuitry 120, having amp control 122a, 122b, sustains constant amplitude vibrations on each of the resonator axes at two different frequencies. The output circuitry 124 determines (e.g., calculates) the angular rate estimate from the forces applied to the resonator axes.

Driving circuitry 112 connects to resonator 118 utilizing actuating means, such as described in regard to FIG. 1. The driving circuitry excites the resonator axes, driving both into vibration at desired reference frequencies. In one embodiment of the driving circuitry, a first reference clock 114a is amplified by variable gain amplifier (VGA) 116a that connects to the resonator sensing means, and similarly a second reference clock 114b is amplified by variable gain amplifier (VGA) 116b that also connects to another axis of the resonator sensing means. There are two reference clocks and two VGAs in order to excite the two resonator axes. The reference clocks produce periodic signals at frequencies designed to be close to the resonator natural frequencies. For example, the reference clocks may be derived from a second gyroscope, or a second and third MEMS oscillator which are designed to closely match the gyroscope axes.

Amplitude control circuitry 120 adjusts the gain of the VGAs 116a, 116b in order to maintain constant displacement or velocity amplitude vibrations of the resonator axes. One of ordinary skill in the art will recognize that a number of different implementations for the amplitude controller could be alternatively selected without departing from the present invention.

The combined effect of drive circuitry and amplitude control circuitry result in constant displacement or velocity amplitude vibrations at different frequencies on each resonator axis. If the displacement or velocity amplitude vibrations are matched, the resulting proof mass trajectory is a Lissajous pattern, as described in regard to FIG. 6.

The output circuitry 124 comprises synchronous demodulators 126a, 126b, a rate reference detector 128, and a rate demodulator 130. Each synchronous demodulator (126a, 126b) produces the in-phase signal 127a, 127c and quadrature signal 127b, 127d components of applied sustaining force relative to the corresponding axis displacement 119. The synchronous demodulator is exemplified here comprising multipliers 132a, 132b, 134a, 134b, phase shifter (90 degree) 136a, 136b, and low pass filters 138a, 138b, 140a, 140b, to produce the in-phase and quadrature components of sustaining force. For the in-phase component, the displacement or velocity signal from a resonator axis multiplies the drive signal of said resonator axis. For the quadrature component, the displacement or velocity signal from a resonator axis is first shifted by 90 degrees then multiplies the drive signal of said resonator axis. In each case, the result is low pass filtered to remove unwanted high frequency components. Two synchronous demodulators demodulate applied forces for the x-axis 127a, 127b and y-axis 127c, 127d.

The rate reference detector 128 in this embodiment produces both the cosine and sine of the phase difference between the displacement signals from the two axes. A phase difference component 142 calculates the phase difference between the two input sinusoids and phase difference functions 144, 146 and determines the cosine and sine of the phase difference 143. One of ordinary skill in the art will appreciate that different implementations of the rate reference detector can be utilized without departing from the teachings of the present invention. In at least one such variation, the displacement or velocity signals from the first and second resonator axes are multiplied together. The result is low pass filtered to remove unwanted high frequency components, giving the cosine of the phase difference. This signal is shifted by 90 degrees to obtain the sine of the phase difference.

The rate demodulator 130 determines the difference 154 between the demodulated quadrature components of the forces, and the sum 148 of the demodulated in-phase components of the forces. The sum 148 of the in-phase components of the forces is multiplied 150 by the sine 146 of the phase difference to form intermediate signal 158. The difference 154 of the quadrature components of the forces is multiplied 156 the cosine 144 of the phase difference, yielding intermediate signal 160. Intermediate signals 158 and 160 are summed 152 to generate the rate estimate 162.

Returning to a discussion of the gyroscope circuit of FIG. 7, it can be shown that the forces as measured on each axis, including relevant error sources, are:

$$F_{xs} = -2mv_o(-\beta_x + (\alpha_z\Omega_z - \Omega_c)\cos\Delta\phi_{xy} + \Omega_{ky}\sin\Delta\phi_{xy})$$

$$F_{ys} = -2mv_o(-\beta_y - (\alpha_z\Omega_z + \Omega_c)\cos\Delta\phi_{xy} - \Omega_{kx}\sin\Delta\phi_{xy})$$

$$F_{xc} = 2mv_o(\omega_{ox} - \dot\phi_x - (\alpha_z\Omega_z - \Omega_c)\sin\Delta\phi_{xy} + \Omega_{ky}\cos\Delta\phi_{xy})$$

$$F_{xc} = 2mv_o(\omega_{oy} - \dot\phi_y - (\alpha_z\Omega_z + \Omega_c)\sin\Delta\phi_{xy} + \Omega_{kx}\cos\Delta\phi_{xy}), \quad (5)$$

where $F_{xs}$ 127b and $F_{ys}$ 127d are the quadrature components of measured forces for the x-axis and y-axis, respectively, $F_{xc}$ 127a and $F_{yc}$ 127c are the in-phase components of measured forces for the x-axis and y-axis, respectively, m is the resonator mass, $v_o$ is the velocity amplitude of the oscillations, $\beta_x$ and $\beta_y$ are the resonator bandwidths, $\omega_{ox}$ and $\omega_{oy}$ are the resonator natural frequencies, $\dot\phi_x$ and $\dot\phi_y$ are the driven frequencies, $\alpha_z$ is the angular gain factor, $\Omega_z$ is the input angular rate, $\Omega_c$ is the bias error due to damper-coupling, $\Omega_{kx}$ and $\Omega_{ky}$ are the errors due to spring-coupling, and $\Delta\phi_{xy}$ 143 is the phase difference between the x- and y-axis oscillations. To simplify the analysis, the velocity amplitudes of the two modes are assumed to be equal. It should be appreciated that in the first two equations, the input angular rate can be separated from spring-coupling and resonator bandwidth terms, as it is the only term multiplied by $\cos\Delta\phi_{xy}$. Similarly, in the last two equations, the input angular rate can be separated from spring-coupling and resonator bandwidth terms, as it is the only term multiplied by $\sin\Delta\phi_{xy}$.

The phase difference between the axes $\Delta\phi_{xy}$ is approximately a ramp function with respect to time. This is because the resonator axes are vibrating at two different frequencies. The phase difference $\Delta\phi_{xy}$ is approximately equal to $\Delta\omega t$, where $\Delta\omega$ is the split frequency. Thus, by the above equations, the rate signal is amplitude modulated to the split frequency. The rate signal is amplitude modulated by $\cos\Delta\phi_{xy}$ in the first two equations and $\sin\Delta\phi_{xy}$ in the last two equations. This is a special type of amplitude modulation wherein a single-sideband demodulation can be used to preserve bandwidth. That is, the bandwidth is not limited to the split frequency.

Considering a dual-force readout gyroscope, it should be appreciated that in an ideal gyroscope, the measured forces are:

$$F_{xs,ideal} = -2mv_o\alpha_z\Omega_z\cos\Delta\phi_{xy}$$

$$F_{ys,ideal} = 2mv_o\alpha_z\Omega_z\cos\Delta\phi_{xy}$$

$$F_{xc,ideal} = -2mv_o\alpha_z\Omega_z\sin\Delta\phi_{xy}$$

$$F_{xc,ideal} = -2mv_o\alpha_z\Omega_z\sin\Delta\phi_{xy}, \quad (6)$$

The measured forces in the case of an ideal gyroscope are purely proportional to input rate; thus, the measurement is free from bias. It is therefore desirable to reject the terms due to $\beta_x$, $\beta_y$, $\Omega_c$, $\Omega_{kx}$, $\Omega_{ky}$, $\omega_{ox}$, $\omega_{oy}$, $\dot\phi_x$, and $\dot\phi_y$ in Eq. 5 for $F_{xs}$, $F_{ys}$, $F_{xc}$, and $F_{yc}$. This is accomplished as follows.

First, the error due to resonator bandwidth $\beta_x$, $\beta_y$ is rejected due to the continuous time modulation of the rate signal. The rate signal $\Omega_z$ is multiplied by $\cos(\Delta\omega t)$, whereas the resonator bandwidth error is not. The multiplication by $\cos(\Delta\omega t)$ effectively shifts the rate signal to a higher frequency so that it may be separated from the term due to $\beta_x$ and $\beta_y$.

Second, the error due to mismatch between resonant frequency and driven frequency $\omega_{ox} - \dot\phi_x$ and $\omega_{oy} - \dot\phi_y$ is rejected due to the continuous time modulation of the rate signal. The rate signal $\Omega_z$ is multiplied by $\sin(\Delta\omega t)$, whereas the mismatch error is not. The multiplication by $\sin(\Delta\omega t)$ effectively shifts the rate signal to a higher frequency so that it may be separated from the term due to $\omega_{ox} - \dot\phi_x$ and $\omega_{oy} - \dot\phi_y$.

Third, the spring-coupling error is rejected as it appears in quadrature with the rate signal. The terms containing $\Omega_{kx}$ and $\Omega_{ky}$ are multiplied by $\sin(\Delta\omega t)$, whereas the terms containing $\Omega_z$ are multiplied by $\cos(\Delta\omega t)$, or vice-versa. Because the sine and cosine functions are orthogonal, the rate signal can be distinguished from the error due to spring coupling.

Fourth, it should be appreciated that the cross-damping error due to $\Omega_c$ appears with the same sign in the equations for $F_{xs}$ and $F_{ys}$, while the rate inputs appear with opposite signs. Similarly, the cross-damping error due to $\Omega_c$ appears with the opposite signs in the equations for $F_{xc}$ and $F_{yc}$, while the rate inputs appear with the same sign. Thus, the cross-damping error is rejected through the operations $F_{xs} - F_{ys}$ and $F_{xc} + F_{yc}$, giving:

$$F_{xs} - F_{ys} = -2mv_o(-\beta_x + \beta_y + 2\alpha_z\Omega_z\cos\Delta\phi_{xy} + (\Omega_{kx} + \Omega_{ky})\sin\Delta\phi_{xy})$$

$$F_{xc} + F_{yc} = 2mv_o(\omega_{ox} + \omega_{oy} - \dot\phi_x - \dot\phi_y - 2\alpha_z\Omega_z\sin\Delta\phi_{xy} + (\Omega_{kx} + \Omega_{ky})\cos\Delta\phi_{xy}) \quad (7)$$

Effectively, cancellation of the cross-damping error is enabled by using both gyroscope axes (x and y) in order to measure rate. Conventional approaches which designate a "drive" and a "sense" axis cannot cancel this error type, as the rate measurement is accomplished with only the sense axis. Multiplication of the first equation by $\cos\Delta\phi_{xy}$ and second equation by $\sin\Delta\phi_{xy}$ and adding gives:

$$(F_{xs} - F_{ys})\cos\Delta\phi_{xy} + (F_{xc} + F_{yc})\sin\Delta\phi_{xy} = -4mv_o\alpha_z\Omega_z + F_{tones}. \quad (8)$$

It should be appreciated that the damper-coupling error only fully cancels when the velocity amplitudes of the two modes are equal. The term $F_{tones}$ represents tones in the output which could be subtracted, filtered, or tuned out. The residual tones are:

$$F_{tones}=2mv_o[(\beta_x-\beta_y)\cos\Delta\phi_{xy}+(\omega_{ox}-\dot\phi_x+\omega_{oy}-\dot\phi_y)\sin\Delta\phi_{xy}]. \quad (9)$$

Many variations on the embodiments described above and represented in the referenced figures are possible. A few of these variations include the following. If the resonator has tuning electrodes, these electrodes can be used to modify the resonant frequencies to match the driven frequencies. If damper-coupling error is not significant, the output can be directly calculated from either a combination of 127a, 127b or a combination of 127c and 127d directly.

4. Alternate Dual Force Readout in Forced Oscillation

Figure 8:
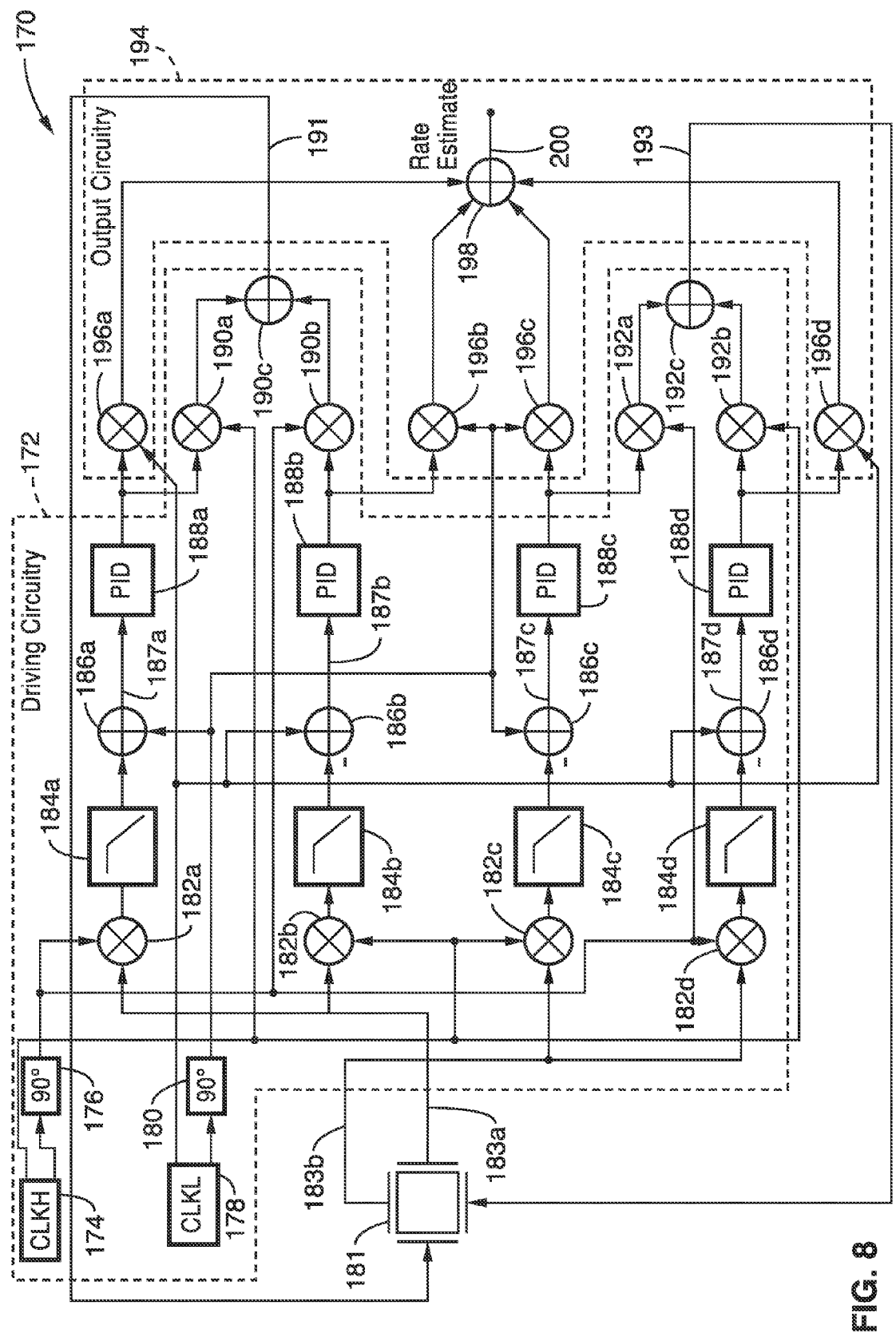
FIG. 8 is a schematic block diagram of an alternate vibratory gyroscope system that derives a high-bandwidth with nominally bias-free rate estimates, according to an embodiment of the present invention.

FIG. 8 illustrates another example embodiment 170 of the dual force-feedback gyroscope in forced oscillation, which is an alternative to FIG. 7. This embodiment comprises a resonator 181, driving circuitry 172, and output circuitry 194. The driving circuitry maintains constant envelope, fixed frequency vibrations on each resonator axis. The output circuitry determines the angular rate from the forces applied to the resonator.

The driving circuitry 172 comprises two reference clocks, CLKH 174 and CLKL 178, quadrature demodulators, baseband PID controllers, and quadrature modulators. The two reference clocks comprise a high frequency clock CLKH 174 and a low frequency clock CLKL 178. The high frequency clock is preferably configured to generate a frequency near the natural frequency of the resonator, while the low frequency clock preferably generates a frequency near the split frequency of the resonator.

The x- and y-axis displacement signals 183a, 183b are synchronously demodulated through multiplication 182a, 182b, 182c, 182d of CLKH 174 and a 90 degree phase shifted 176 version of CLKH. The resultant signals, after low pass filtering 184a, 184b, 184c, 184d, produces the in-phase and quadrature components of the displacement signals relative to CLKH for each axis 187a, 187b, 187c, 187d.

For each axis, the in-phase and quadrature components of the displacement signals are controlled to have a fixed phase relationship to CLKL 178. For the x-axis, the in-phase displacement signal 187b is controlled to track CLKL 179, and the quadrature displacement signal 187a is controlled to track a 90 degree phase shifted version 180 of CLKL. The result is that the axis displacement signal 183a is lower-sideband modulated with the modulation signal CLKL. Equivalently, the axis displacement signal will be a constant envelope sinusoid with frequency equal to the difference of the CLKH and CLKL frequencies.

The y-axis displacement signals are controlled in the opposite way. The in-phase displacement signal 187c is controlled to track the 90 degree phase shifted version of CLKL 180, and the quadrature displacement signal 187d tracks CLKL 178. The result is that the y-axis displacement signal is upper-sideband modulated with the modulation signal CLKL 178. Equivalently, the y-axis displacement signal will be a constant envelope sinusoid with frequency equal to the sum of the CLKH 174 and CLKL 178 frequencies.

Control of the displacement signals 187a, 187b, 187c, 187d is accomplished with difference blocks 186a, 186b, 186c, 186d followed by PID controllers 188a, 188b, 188c, 188d. The difference blocks compare the displacement signals against the control signals, and the PID blocks adjust their output signals in order to minimize the error between the signal and the control.

The combined effect of drive circuitry and control circuitry result in constant displacement or velocity amplitude vibrations at different frequencies on each resonator axis. If the displacement or velocity amplitude vibrations are matched, the resulting proof mass trajectory is a Lissajous pattern, as was previously described in regard to FIG. 6.

For the x-axis, the outputs of the PID controllers 188a, 188b, 188c, 188d, are coupled to a quadrature modulator, comprising multipliers 190a, 190b and an adder 190c to generate signal 191. The quadrature modulator multiplies 190a the PID output 188a by CLKH 174, and multiplies 190b the PID output 188b by the 90 degree phase shifted CLKH 176, whose outputs are summed 190c into output 191 connected to the x-axis via actuating means.

For the y-axis, the outputs of the PID controllers are fed to a quadrature modulator, comprising multipliers 192a, 192b and an adder 192c. The quadrature modulator multiplies 192b the PID output 188d by CLKH 174, and the PID output 188c by the 90 degree phase shifted CLKH 176, whose outputs are then summed 192c to generate output 193 coupled to the y-axis via actuating means.

Output circuitry 194 comprises multipliers 196a, 196b, 196c, 196d along with adder 198. The multipliers produce the in-phase and quadrature components of the outputs of the PID controllers 188a, 188b, 188c, 188d, with respect to the reference CLKL 178. Multiplier 196a produces the in-phase component of control force produced by PID 188a; multiplier 196b produces the quadrature component of control force produced by PID 188b; multiplier 196c produces the quadrature component of control force produced by PID 188c; and multiplier 196d produces the in-phase component of control force produced by PID 188d. Adder 198 combines the in-phase and quadrature components with signs to output a rate estimate 200.

The alternate implementation described above yields the same benefits as the system described for FIG. 7. The mathematical description given in the previous section applies equally well to the alternative implementation. The system provides a nominally bias-free rate estimate with high-bandwidth.

From the discussion above it will be appreciated that the invention can be embodied in various ways, including but not limited to the following:

1. A vibratory gyroscope apparatus, comprising: a mechanical resonator having a first mode of vibration in a first axis of motion and an associated first natural frequency, and a second mode of vibration in a second axis of motion having an associated second natural frequency, wherein angular rate of motion input couples energy between said first mode of vibration and said second mode of vibration; sensors and actuators for each of the first mode and the second mode for transduction of an electrical signal into a mechanical vibration and transduction of a mechanical vibration into an electrical signal; driving circuitry connected to the actuators creating mechanical forces to maintain substantially constant, non-zero velocity amplitude vibrations in the first mode at a first frequency and the second mode at a second frequency; output circuitry to infer an angular rate of motion from the mechanical forces created by said driving circuitry to said first mode or said second mode, or both said first mode and said second mode; and wherein said output circuitry is configured to provide bias error cancellation based on excitation and sensing of both resonator axes and measuring sustaining forces applied to both axes of said mechanical resonator.

2. The apparatus of any of the previous embodiments, wherein said bias error cancelation is achieved in response to angular rate of motion being modulated to a frequency above one or more bias error sources, whereby bias error is cancelled by filtering it out, since the rate signal is at a higher frequency than the bias error.

3. The apparatus of any of the previous embodiments, wherein said modulating of frequency above the bias error sources is in contrast to techniques in which certain bias error sources are added to angular rate of motion, 4. The apparatus of any of the previous embodiments, wherein said bias error cancelation is performed in the apparatus without interrupting the ordinary rate measurement process and without the need for a known, or reference, angular rate input.

5. The apparatus of any of the previous embodiments, wherein modulation that arises because said first and second axes of motion are oscillating at two different frequencies cancels error terms due to the non-zero resonator bandwidth and mismatch between natural frequency and driven frequency.

6. The apparatus of any of the previous embodiments, wherein cross-spring bias error is rejected as it appears in quadrature with the rate signal.

7. The apparatus of any of the previous embodiments, wherein cross-damping bias error is cancelled in response to combining rate measurements from said first and second axes of motion, as contrasted to gyroscope configurations having a drive and a sense axis which do not allow cross-damping error to be separated from angular rate of motion since they only measure rate on their sense axis.

8. The apparatus of any of the previous embodiments, wherein said apparatus performs sensing of both said first and second axes of motion for said mechanical resonator, as distinct from approaches which drive a first axis and sense on a second axis.

9. The apparatus of any of the previous embodiments, wherein said natural frequencies on said first axis and said second axis of motion are not equal resulting in a finite frequency difference between the axes, as a split frequency.

10. The apparatus of any of the previous embodiments, The apparatus recited in claim 1, further comprising at least one synchronous demodulator within said output circuitry, wherein said synchronous demodulator is configured for generating in-phase components, quadrature component, or a combination of in phase and quadrature components, of mechanical force applied to a mode with a phase reference being determined by displacement or velocity of the mode.

11. The apparatus of any of the previous embodiments, further comprising amplitude control circuitry connected to said sensors for controlling said driving circuitry, wherein said amplitude control circuitry adjusts the magnitude of applied driving voltage in order to maintain a constant displacement amplitude or velocity amplitude of the said first mode or said second mode, or both said first mode and said second mode.

12. The apparatus of any of the previous embodiments, wherein the displacement or velocity amplitudes of the first mode and the second mode are constant and substantially equal.

13. The apparatus of any of the previous embodiments, further comprising a rate reference detector in said output circuitry, wherein said rate reference detector generates one or more of the phase difference signals between first mode and second mode vibrations.

14. The apparatus of any of the previous embodiments, wherein said one or more of the phase difference signals comprise a sine of said phase difference, or a cosine of the said phase difference, or both a sine and a cosine of said phase difference.

15. The apparatus of any of the previous embodiments, wherein the output circuitry further comprises a rate demodulator connected to a synchronous demodulator and rate reference detector, wherein said rate demodulator produces one or both of the in-phase and quadrature components of at least one of the demodulated mechanical forces or at least one of a linear combination of demodulated forces with a phase reference being defined by the rate reference detector.

16. The apparatus of any of the previous embodiments, wherein said variable gain amplifier (VGA) and phase shifter comprises a Pierce oscillator circuit.

17. The apparatus of any of the previous embodiments, wherein said vibratory gyroscope comprises a high-bandwidth gyroscope configured with oscillation frequencies determined by external oscillation references, instead of utilizing self-referenced oscillation in which frequencies are determined by natural resonant frequencies of both axes, whereby utilizing the external oscillation references additional information is obtained from said vibratory gyroscope to extend bandwidth.

18. The apparatus of any of the previous embodiments, wherein said mechanical resonator is suspended for movement along two orthogonal axes simultaneously.

19. The apparatus of any of the previous embodiments, wherein said vibratory gyroscope is configured to follow a Lissajous trajectory.

20. The apparatus of any of the previous embodiments, wherein said vibratory gyroscope is configured for application to inertial navigation, stabilization, or maintaining direction.

21. A vibratory gyroscope apparatus, comprising: (a) a mechanical resonator having a first mode of vibration in a first axis of motion and an associated first natural frequency, and a second mode of vibration in a second axis of motion having an associated second natural frequency, wherein angular rate of motion input couples energy between said first mode of vibration and said second mode of vibration; (b) sensors and actuators for each of the first mode and the second mode for transduction of an electrical signal into a mechanical vibration and transduction of a mechanical vibration into an electrical signal; (c) driving circuitry connected to the actuators creating mechanical forces to maintain substantially constant, non-zero velocity amplitude vibrations in the first mode at a first frequency and the second mode at a second frequency; (d) output circuitry to infer an angular rate of motion from the mechanical forces created by said driving circuitry to said first mode or said second mode, or both said first mode and said second mode; and (e) wherein said output circuitry is configured to provide bias error cancellation based on excitation and sensing of both resonator axes and measuring sustaining forces applied to both axes of said mechanical resonator, in response to, (e)(i) modulating angular rate of motion to a frequency sufficiently above one or more bias error sources to allow filtering bias error sources out of angular rate of motion, or (e)(ii) driving oscillating frequencies of said first and said second axes of motion at two different frequencies from which modulation arises that cancels error terms due to non-zero resonator bandwidth and mismatch between natural frequency and driven frequency, or (e) (iii) rejecting cross-spring bias error in response to it appearing in quadrature with the rate signal, or (e)(iv) rejecting cross-damping bias error in response to combining measurement of angular rate of motion from said first and second axes of motion, as contrasted to gyroscope configurations having a drive and a sense axis which do not allow cross-damping error to be separated from angular rate of motion since they only measure rate on their sense axis, or (e)(v) cancelling bias error in response to any combination of approaches (e)(i) through (e)(iv) listed above.

22. The apparatus of any of the previous embodiments, wherein said bias error cancelation is performed in the apparatus without interrupting the ordinary rate measurement process and without the need for a known, or reference, angular rate input.

23. The apparatus of any of the previous embodiments, wherein said apparatus performs sensing of both said first and second axes of motion for said mechanical resonator, as distinct from approaches which drive a first axis and sense on a second axis.

24. The apparatus of any of the previous embodiments, wherein said natural frequencies on said first axis and said second axis of motion are not equal resulting in a finite frequency difference between the axes, as a split frequency.

25. The apparatus of any of the previous embodiments, further comprising at least one synchronous demodulator within said output circuitry, wherein said synchronous demodulator is configured for generating in-phase components, quadrature component, or a combination of in phase and quadrature components, of mechanical force applied to a mode with a phase reference being determined by displacement or velocity of the mode.

26. The apparatus of any of the previous embodiments, further comprising amplitude control circuitry connected to said sensors for controlling said driving circuitry, wherein said amplitude control circuitry adjusts the magnitude of applied driving voltage in order to maintain a constant displacement amplitude or velocity amplitude of the said first mode or said second mode, or both said first mode and said second mode.

27. The apparatus of any of the previous embodiments, wherein the displacement or velocity amplitudes of the first mode and the second mode are constant and substantially equal.

28. The apparatus of any of the previous embodiments, further comprising a rate reference detector in said output circuitry, wherein said rate reference detector generates one or more of the phase difference signals between first mode and second mode vibrations.

29. The apparatus of any of the previous embodiments, wherein said one or more of the phase difference signals comprise a sine of said phase difference, or a cosine of the said phase difference, or both a sine and a cosine of said phase difference.

30. The apparatus of any of the previous embodiments, wherein the output circuitry further comprises a rate demodulator connected to a synchronous demodulator and rate reference detector, wherein said rate demodulator produces one or both of the in-phase and quadrature components of at least one of the demodulated mechanical forces or at least one of a linear combination of demodulated forces with a phase reference being defined by the rate reference detector.

31. The apparatus of any of the previous embodiments, wherein said variable gain amplifier (VGA) and phase shifter comprises a Pierce oscillator circuit.

32. The apparatus of any of the previous embodiments, wherein said vibratory gyroscope comprises a high-bandwidth gyroscope configured with oscillation frequencies determined by external oscillation references, instead of utilizing self-referenced oscillation in which frequencies are determined by natural resonant frequencies of both axes, whereby utilizing the external oscillation references additional information is obtained from said vibratory gyroscope to extend bandwidth.

33. A vibratory gyroscope apparatus, comprising: (a) a mechanical resonator having a first mode of vibration in a first axis of motion and an associated first natural frequency, and a second mode of vibration in a second axis of motion having an associated second natural frequency, wherein angular rate of motion input couples energy between said first mode of vibration and said second mode of vibration; (b) sensors and actuators for each of the first mode and the second mode for transduction of an electrical signal into a mechanical vibration and transduction of a mechanical vibration into an electrical signal; (c) driving circuitry connected to the actuators creating mechanical forces to maintain substantially constant, non-zero velocity amplitude vibrations in the first mode at a first frequency and the second mode at a second frequency; (d) output circuitry to infer an angular rate of motion from the mechanical forces created by said driving circuitry to said first mode or said second mode, or both said first mode and said second mode; and (e) wherein said output circuitry is configured to provide bias error cancellation based on excitation and sensing of both resonator axes and measuring sustaining forces applied to both axes of said mechanical resonator, in response to, (e)(i) modulating angular rate of motion to a frequency sufficiently above one or more bias error sources to allow filtering bias error sources out of angular rate of motion, (e)(ii) driving oscillating frequencies of said first and said second axes of motion at two different frequencies from which modulation arises that cancels error terms due to non-zero resonator bandwidth and mismatch between natural frequency and driven frequency, (e)(iii) rejecting cross-spring bias error in response to it appearing in quadrature with the rate signal, and (e)(iv) rejecting cross-damping bias error in response to combining measurement of angular rate of motion from said first and second axes of motion, as contrasted to gyroscope configurations having a drive and a sense axis which do not allow cross-damping error to be separated from angular rate of motion since they only measure rate on their sense axis.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A vibratory gyroscope apparatus, comprising:
   a mechanical resonator having a first mode of vibration in a first axis of motion and an associated first natural frequency, and a second mode of vibration in a second axis of motion having an associated second natural frequency, wherein angular rate of motion input couples energy between said first mode of vibration and said second mode of vibration;
   sensors and actuators for each of the first mode and the second mode for transduction of an electrical signal into a mechanical vibration and transduction of a mechanical vibration into an electrical signal;
   driving circuitry connected to the actuators creating mechanical forces to maintain substantially constant, non-zero velocity amplitude vibrations in the first mode at a first frequency and the second mode at a second frequency; and
   output circuitry to infer an angular rate of motion from the mechanical forces created by said driving circuitry to said first mode or said second mode, or both said first mode and said second mode;
   wherein said output circuitry is configured to provide bias error cancellation based on excitation and sensing of both resonator axes and measuring sustaining forces applied to both axes of said mechanical resonator; and
   wherein bias error cancellation is achieved in response to angular rate of motion being modulated to a frequency above one or more bias error sources, whereby bias error is cancelled by filtering it out, since the modulated rate signal is at a higher frequency than the bias error; and
   wherein said bias error cancellation is performed without interrupting ordinary rate measurement and without the need for a known, or reference, angular rate input.

2. The apparatus recited in claim 1, wherein modulation that arises because said first and second axes of motion are oscillating at two different frequencies cancels error terms due to the non-zero resonator bandwidth and mismatch between natural frequency and driven frequency.

3. The apparatus recited in claim 1, wherein cross-spring bias error is rejected as it appears in quadrature with the rate signal.

4. The apparatus recited in claim 1, wherein cross-damping bias error is cancelled in response to combining rate measurements from said first and second axes of motion, as contrasted to gyroscope configurations having a drive and a sense axis which do not allow cross-damping error to be separated from angular rate of motion since they only measure rate on their sense axis.

5. The apparatus recited in claim 1, wherein said apparatus performs sensing of both said first and second axes of motion for said mechanical resonator, as distinct from approaches which drive a first axis and sense on a second axis.

6. The apparatus recited in claim 1, wherein said natural frequencies on said first axis and said second axis of motion are not equal resulting in a finite frequency difference between the axes, a split frequency.

7. The apparatus recited in claim 1, further comprising at least one synchronous demodulator within said output circuitry, wherein said synchronous demodulator is configured for generating in-phase components, quadrature component, or a combination of in phase and quadrature components, of mechanical force applied to a mode with a phase reference being determined by displacement or velocity of the mode.

8. The apparatus recited in claim 1, further comprising amplitude control circuitry connected to said sensors for controlling said driving circuitry, wherein said amplitude control circuitry adjusts the magnitude of applied driving voltage in order to maintain a constant displacement amplitude or velocity amplitude of the said first mode or said second mode, or both said first mode and said second mode.

9. The apparatus recited in claim 8, wherein the displacement or velocity amplitudes of the first mode and the second mode are constant and substantially equal.

10. The apparatus recited in claim 8, further comprising a rate reference detector in said output circuitry, wherein said rate reference detector generates one or more of the phase difference signals between first mode and second mode vibrations.

11. The apparatus recited in claim 10, wherein said one or more of the phase difference signals comprise a sine of said phase difference, or a cosine of said phase difference, or both a sine and a cosine of said phase difference.

12. The apparatus recited in claim 10, wherein the output circuitry further comprises a rate demodulator connected to a synchronous demodulator and rate reference detector, wherein said rate demodulator produces one or both of the in-phase and quadrature components of at least one of the demodulated mechanical forces or at least one of a linear combination of demodulated forces with a phase reference being defined by the rate reference detector.

13. The apparatus recited in claim 1, wherein said driving circuitry comprises a variable gain amplifier (VGA) and a phase shifter.

14. The apparatus recited in claim 1, wherein said vibratory gyroscope comprises a gyroscope configured with oscillation frequencies determined by external oscillation references, instead of utilizing self-referenced oscillation in which frequencies are determined by natural resonant frequencies of both axes, whereby utilizing the external oscillation references additional information is obtained from said vibratory gyroscope to extend bandwidth.

15. The apparatus recited in claim 1, wherein said mechanical resonator is suspended for movement along two orthogonal axes simultaneously.

16. The apparatus recited in claim 1, wherein said vibratory gyroscope is configured to follow a Lissajous trajectory.

17. The apparatus recited in claim 1, wherein said vibratory gyroscope is configured for application to inertial navigation, stabilization, or maintaining direction.

18. A vibratory gyroscope apparatus, comprising:
   (a) a mechanical resonator having a first mode of vibration in a first axis of motion and an associated first natural frequency, and a second mode of vibration in a second axis of motion having an associated second natural frequency, wherein angular rate of motion input couples energy between said first mode of vibration and said second mode of vibration;
   (b) sensors and actuators for each of the first mode and the second mode for transduction of an electrical signal into a mechanical vibration and transduction of a mechanical vibration into an electrical signal;
   (c) driving circuitry connected to the actuators creating mechanical forces to maintain substantially constant, non-zero velocity amplitude vibrations in the first mode at a first frequency and the second mode at a second frequency;
(d) output circuitry to infer an angular rate of motion from the mechanical forces created by said driving circuitry to said first mode or said second mode, or both said first mode and said second mode; and
(e) wherein said output circuitry is configured to provide bias error cancellation based on excitation and sensing of both resonator axes and measuring sustaining forces applied to both axes of said mechanical resonator, in response to:
  (i) modulating angular rate of motion to a frequency sufficiently above one or more bias error sources to allow filtering bias error sources out of angular rate of motion, or
  (ii) driving oscillating frequencies of said first and said second axes of motion at two different frequencies from which modulation arises that cancels error terms due to non-zero resonator bandwidth and mismatch between natural frequency and driven frequency, or
  (iii) rejecting cross-spring bias error in response to it appearing in quadrature with the rate signal, or
  (iv) rejecting cross-damping bias error in response to combining measurement of angular rate of motion from said first and second axes of motion, as contrasted to gyroscope configurations having a drive and a sense axis which do not allow cross-damping error to be separated from angular rate of motion since they only measure rate on their sense axis, or
  (v) cancelling bias error in response to any combination of approaches (i) through (iv) listed above;
(f) wherein bias error cancellation is performed without interrupting ordinary rate measurement and without the need for a known, or reference, angular rate input.

19. The apparatus recited in claim 18, wherein said apparatus performs sensing of both said first and second axes of motion for said mechanical resonator, as distinct from approaches which drive a first axis and sense on a second axis.

20. The apparatus recited in claim 18, wherein said natural frequencies on said first axis and said second axis of motion are not equal resulting in a finite frequency difference between the axes, as a split frequency.

21. The apparatus recited in claim 18, further comprising at least one synchronous demodulator within said output circuitry, wherein said synchronous demodulator is configured for generating in-phase components, quadrature component, or a combination of in phase and quadrature components, of mechanical force applied to a mode with a phase reference being determined by displacement or velocity of the mode.

22. The apparatus recited in claim 18, further comprising amplitude control circuitry connected to said sensors for controlling said driving circuitry, wherein said amplitude control circuitry adjusts the magnitude of applied driving voltage in order to maintain a constant displacement amplitude or velocity amplitude of the said first mode or said second mode, or both said first mode and said second mode.

23. The apparatus recited in claim 22, wherein the displacement or velocity amplitudes of the first mode and the second mode are constant and substantially equal.

24. The apparatus recited in claim 22, further comprising a rate reference detector in said output circuitry, wherein said rate reference detector generates one or more of the phase difference signals between first mode and second mode vibrations.

25. The apparatus recited in claim 24, wherein said one or more of the phase difference signals comprise a sine of said phase difference, or a cosine of the said phase difference, or both a sine and a cosine of said phase difference.

26. The apparatus recited in claim 24, wherein the output circuitry further comprises a rate demodulator connected to a synchronous demodulator and rate reference detector, wherein said rate demodulator produces one or both of the in-phase and quadrature components of at least one of the demodulated mechanical forces or at least one of a linear combination of demodulated forces with a phase reference being defined by the rate reference detector.

27. The apparatus recited in claim 18, wherein said driving circuitry comprises a variable gain amplifier (VGA) and a phase shifter.

28. The apparatus recited in claim 18, wherein said vibratory gyroscope comprises a high-bandwidth gyroscope configured with oscillation frequencies determined by external oscillation references, instead of utilizing self-referenced oscillation in which frequencies are determined by natural resonant frequencies of both axes, whereby utilizing the external oscillation references additional information is obtained from said vibratory gyroscope to extend bandwidth.

29. A vibratory gyroscope apparatus, comprising:
(a) a mechanical resonator having a first mode of vibration in a first axis of motion and an associated first natural frequency, and a second mode of vibration in a second axis of motion having an associated second natural frequency, wherein angular rate of motion input couples energy between said first mode of vibration and said second mode of vibration;
(b) sensors and actuators for each of the first mode and the second mode for transduction of an electrical signal into a mechanical vibration and transduction of a mechanical vibration into an electrical signal;
(c) driving circuitry connected to the actuators creating mechanical forces to maintain substantially constant, non-zero velocity amplitude vibrations in the first mode at a first frequency and the second mode at a second frequency;
(d) output circuitry to infer an angular rate of motion from the mechanical forces created by said driving circuitry to said first mode or said second mode, or both said first mode and said second mode; and
(e) wherein said output circuitry is configured to provide bias error cancellation based on excitation and sensing of both resonator axes and measuring sustaining forces applied to both axes of said mechanical resonator, in response to:
  (i) modulating angular rate of motion to a frequency sufficiently above one or more bias error sources to allow filtering bias error sources out of angular rate of motion,
  (ii) driving oscillating frequencies of said first and said second axes of motion at two different frequencies from which modulation arises that cancels error terms due to non-zero resonator bandwidth and mismatch between natural frequency and driven frequency,
  (iii) rejecting cross-spring bias error in response to it appearing in quadrature with the rate signal, and
  (iv) rejecting cross-damping bias error in response to combining measurement of angular rate of motion from said first and second axes of motion, as contrasted to gyroscope configurations having a drive and a sense axis which do not allow cross-damping error to be separated from angular rate of motion since they only measure rate on their sense axis.

* * * * *